(12) United States Patent
Kouzuki

(10) Patent No.: US 6,386,650 B2
(45) Date of Patent: May 14, 2002

(54) ARRANGEMENT CONSTRUCTION OF ABS SYSTEM

(75) Inventor: Atsushi Kouzuki, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/834,168

(22) Filed: Apr. 12, 2001

(30) Foreign Application Priority Data

Apr. 12, 2000 (JP) ........................................ 2000-110223

(51) Int. Cl.$^7$ ........................... B60T 8/32; B60T 17/04; B62D 23/00
(52) U.S. Cl. ............................ 303/121; 303/1; 188/152
(58) Field of Search ..................... 303/121, 1, DIG. 10, 303/86, 81; 188/181 R, 181 A, 152; 248/635, 225.11, 638

(56) References Cited

U.S. PATENT DOCUMENTS 6,286,638 B1 * 9/2001 Rowan et al.

FOREIGN PATENT DOCUMENTS

| JP | 250549 | * | 9/1998 |
| JP | 297457 | * | 11/1998 |
| JP | 108868 | * | 4/2000 |
| JP | 174480 | * | 6/2001 |

* cited by examiner

Primary Examiner—Douglas C. Butler
(74) Attorney, Agent, or Firm—Alston & Bird LLP

(57) ABSTRACT

An ABS actuator bracket 5 is formed by a bracket base 20 on which an ABS actuator 2 is mounted and vehicle body attachment elements 21a to 21c which is attached to a vehicle body panel 4. A space portion 32 having a distance L corresponding to the dimension of a vehicle part such as a harness (main harness 33) is provided between the vehicle body panel 4 and the ABS actuator bracket 5 in a state in which the ABS actuator bracket 5 is attached to the vehicle body panel 4, so that the vehicle part is arranged so as to pass through the space portion 32.

10 Claims, 7 Drawing Sheets

ARRANGEMENT CONSTRUCTION OF ABS SYSTEM

FIELD OF THE INVENTION AND RELATED ART STATEMENT

The present invention relates to an arrangement construction of an ABS system (antilock brake system).

The purpose of the ABS system mounted on a motor vehicle is to increase the stability of vehicle body posture and the driveability in the case of sudden braking and in other cases. The ABS system has a construction such that an ABS actuator for controlling the pressure of oil sent to each of wheel cylinders is disposed at an intermediate position of a brake pipe which connects a master cylinder to the wheel cylinder for a front wheel and a rear wheel. When the ABS system is mounted, it is usually disposed in an engine room on the vehicle body front side from viewpoints of shortening of the brake pipe around the ABS actuator, simplicity of pipeline, and the like.

FIG. 8 shows a conventional arrangement construction of an ABS system. In this figure, an ABS actuator 61, which is a principal component of the ABS system, is installed to a vehicle body via an ABS actuator bracket 62. Specifically, the ABS actuator 61 is mounted on a bracket base 62a of the ABS actuator bracket 62 and is fastened by bolting or other means, and in this state, a plurality of vehicle body attachment elements 62b of the ABS actuator bracket 62 are attached to the vehicle body side by bolting or other means, by which the ABS actuator 61 is fixed to the vehicle body via the ABS actuator bracket 62. The attachment position of the ABS actuator bracket 62 is set, considering the layout etc., in a location on a substantially horizontal vehicle body panel 67 formed in a tire house 66 between a suspension tower (strut attachment portion) 64 in an engine room 63 and a dash panel 65.

The ABS actuator bracket 62 having been used conventionally is a sheet part, and as shown in FIGS. 8 and 9(a) to 9(c), it is made up of the flat-shaped bracket base 62a and the vehicle body attachment elements 62b (in these figures, three vehicle body attachment elements 62b are provided), which are flush with the bracket base 62a and project horizontally to the outside from predetermined edges of the bracket base 62a. The aforementioned bracket base 62a is provided with erection elements 62c for attaching the ABS actuator 61, for example, in both front and rear end portions. Thus, the ABS actuator 61 is attached to the erection elements 62c by bolting or other means, and the vehicle body attachment elements 62b are attached to the vehicle body panel 67. In this state, the flat-shaped bracket base 62a of the ABS actuator bracket 62 is flush against the vehicle body panel 67, and the lower surface of the bracket base 62a is brought into contact with the upper surface of the vehicle body panel 67 without a gap therebetween substantially over the whole area.

However, the above-described conventional arrangement construction of an ABS system has problems as described below. In the conventional arrangement construction, the ABS actuator bracket 62 is attached in the state in which the bracket base 62a of the ABS actuator bracket 62 is flush against the vehicle body panel 67. Therefore, dust and water are liable to be accumulated between the bracket base 62a and the vehicle body panel 67, and the dust and water accumulated therebetween sometimes cause a failure of the ABS actuator 61, corrosion of the vehicle body panel 67, and other troubles. In order to remove the dust and water accumulated between the bracket base 62a and the vehicle body panel 67, the ABS actuator bracket 62 must be removed from the vehicle body panel 67, the work for removal being troublesome.

Moreover, a main harness (cable) for supplying power to the ABS actuator 61 and other various electrical parts for vehicle body, ABS harnesses (not shown) for connecting various sensors (not shown) such as a wheel speed sensor and a body acceleration sensor to the ABS actuator 61, and other harnesses may be damaged by the contact with an edge of the ABS actuator bracket 62. Therefore, it is actually difficult to lay out harnesses and cables around the ABS actuator bracket 62. Also, harnesses and cables laid out in an unconstrained state are vibrated by vibrations of vehicle body occurring during running and therefore hit a plurality of brake pipes 68 (see FIG. 8), which are important members, connected to the ABS actuator 61, so that these brake pipes 68 may be damaged.

OBJECT AND SUMMARY OF THE INVENTION

The present invention has been made to solve the above problems, and accordingly an object thereof is to provide an arrangement construction of an ABS system configured so that a vehicle part such as a harness laid out around an ABS actuator can be protected, the vehicle part such as a harness can be prevented from hitting a brake pipe, and moreover the strength of an ABS actuator bracket can be increased.

To achieve the above object, the present invention provides an arrangement construction of an ABS system, comprising an ABS actuator for preventing a wheel from locking at the time of braking, the ABS actuator constituting the ABS system; an ABS actuator bracket for fixing the ABS actuator to a vehicle body panel; ABS harnesses for connecting various sensors such as a wheel speed sensor and a vehicle body acceleration sensor to the ABS actuator; and brake pipes for supplying and discharging brake oil to and from the ABS actuator, wherein the ABS actuator bracket is formed by a bracket base on which the ABS actuator is mounted and vehicle body attachment elements attached to the vehicle body panel, and a space portion having a space corresponding to the dimension of a vehicle part such as a harness is provided between the vehicle body panel and the bracket base of the ABS actuator bracket in a state in which the ABS actuator bracket is attached to the vehicle body panel, whereby the vehicle part is arranged so as to pass through the space portion.

Also, in the present invention, protecting means for protecting the vehicle part is provided at the end of the bracket base of the ABS actuator bracket corresponding to the vehicle part.

Also, in the present invention, a flange, which is formed so as to erect by bending a part of the bracket base to the opposite side to the space portion, is provided as the protecting means.

Also, in the present invention, a bent portion of the flange with respect to the end of the bracket base has a curved shape, and the curvedly-shaped portion is arranged so as to correspond to the vehicle part.

Also, in the present invention, an ABS harness attachment element for fixing the ABS harnesses to the ABS actuator bracket is formed integrally with the flange.

Also, in the present invention, the ABS harness attachment element is provided at the end of the bracket base of the ABS actuator bracket in a state of being bent upward with respect to the bracket base and being erected substantially vertically, so that the brake pipes are arranged between the ABS harness attachment element and the ABS actuator, and the ABS harnesses are attached to a location on the opposite side to the brake pipes with respect to the ABS harness attachment element.

Also, in the present invention, the ABS harness attachment element is formed with an elongated hole for lockingly fixing an ABS harness positioning clip in a locked state, so that the clip is lockingly fixed to the elongated hole in a locked state to position the ABS harness with the clip, and the ABS harnesses are laid out in the direction farther from the brake pipes by the positioning of the ABS harnesses by using the clip.

Also, in the present invention, a flange, which is bent so as to have a curved face and extends vertically, is provided in the side portion of the ABS harness attachment portion as ABS harness protecting means, and the ABS harnesses are laid out so as to be in contact with the curved face of the root portion of the flange.

Also, the present invention provides an arrangement construction of an ABS system, in which a vehicle part attachment element is provided on an ABS actuator bracket for attaching an ABS actuator to a vehicle body panel, the vehicle part attachment element is arranged at a position at which brake pipes of the ABS actuator are separated from a vehicle part, and at least one of the brake pipe and the vehicle part is fixed to the vehicle part attachment element.

Also, in the present invention, the vehicle part is ABS harnesses for connecting various sensors such as a wheel speed sensor and a vehicle body acceleration sensor to the ABS actuator.

DETAILED DESCRIPTION OF PREFERRED EMBODIMENTS

Figure 1:
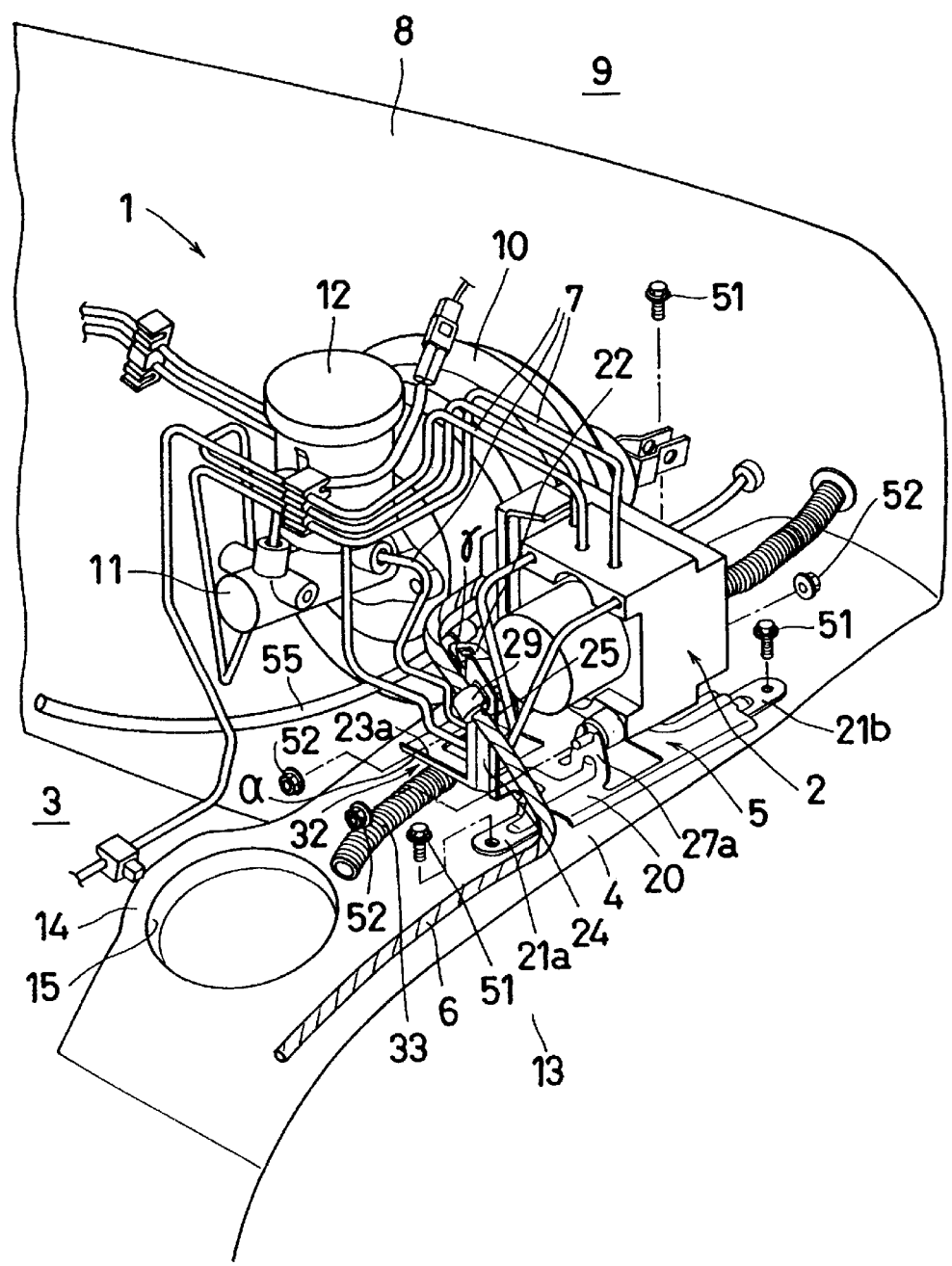
FIG. 1 is a perspective view showing an arrangement construction of an ABS system in accordance with an embodiment of the present invention.

FIGS. 1 to 4 show an arrangement construction of an ABS system 1 in accordance with one embodiment of the present invention. The ABS system 1, which is provided to prevent wheels from locking at the time of braking, includes an ABS actuator 2, an ABS actuator bracket 5 for fixing the ABS actuator 2 on a vehicle body panel 4 (on a tire house) in an engine room 3, a plurality of ABS harnesses 6 for connecting various sensors (not shown) such as a wheel speed sensor and a vehicle body acceleration sensor to the ABS actuator 2, and a plurality of brake pipes 7 for supplying and discharging brake oil to and from the ABS actuator 2. In FIG. 1, reference numeral 8 denotes a dash panel for separating an engine room from a cabin 9, 10 denotes a brake booster attached to an engine room-side surface of the dash panel 8, 11 denotes a brake master cylinder connected to the front side of the brake booster 10, 12 denotes a reservoir tank connected to the brake master cylinder 11, 13 denotes a fender panel, 14 denotes a suspension tower, and 15 denotes a strut mount portion provided on a ceiling of the suspension tower 14. Also, in FIGS. 2 and 3, reference numeral 16 denotes a fender inner panel (vehicle body panel 4), and 17 denotes a fender outer panel.

As shown in FIG. 1, the above-described ABS actuator 2 is attached to the vehicle body panel 4 on a wheel house via the ABS actuator bracket 5 in the vicinity of the side of the brake booster 10 and the brake master cylinder 11. As clearly shown in FIGS. 4 and 5, the ABS actuator bracket 5 is a part formed by bending one steel plate, having a bracket base 20 for mounting the ABS actuator 2 thereon, one vehicle body attachment element 21a projectingly provided on one side of front end of the bracket base 20, a pair of vehicle body attachment elements 21b and 21c projectingly provided on both sides, left and right, of rear end of the bracket base 20, and an auto cruise cable attachment element 22 projectingly provided at the inside end of the bracket base 20.

Figure 4:
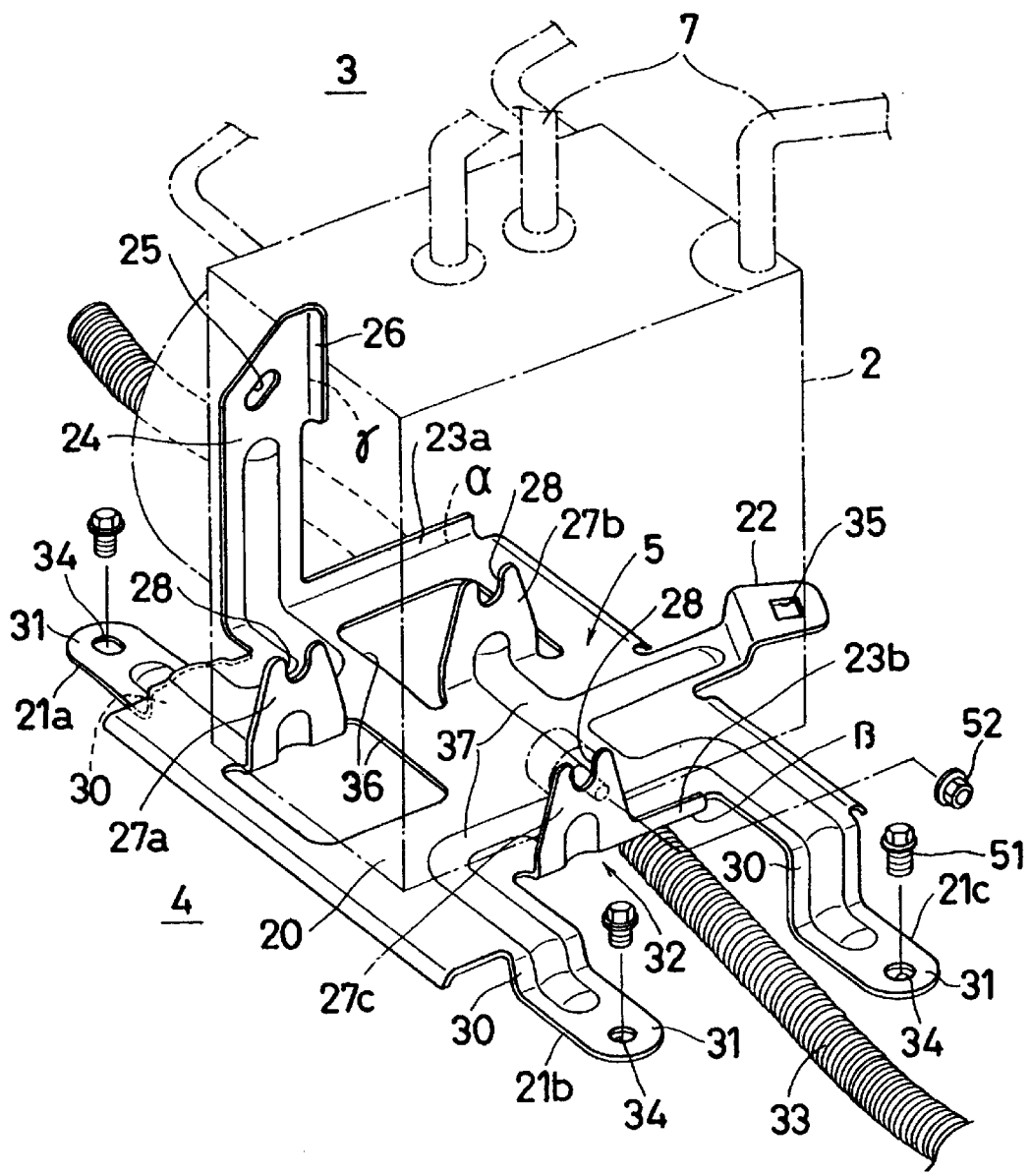
FIG. 4 is a perspective view showing a state in which an ABS actuator is attached to an ABS actuator bracket.

A portion of the front end of the bracket base 20, excluding a location where the vehicle body attachment element 21a is arranged, is provided with a flange 23a bent upward substantially at right angles to the bracket base 20 so as to have a curved face a at the bent portion, and a portion between the paired vehicle body attachment elements 21b and 21c at the rear end of the bracket base 20 is provided with a flange 23b bent upward substantially at right angles to the bracket base 20, like the flange 23a, so as to have a curved face β at the bent portion (see FIG. 4). Specifically, the flanges 23a and 23b, which are erected substantially vertically by bending the portions of the bracket base 20 upward (to the opposite side to a later-described space portion 32), are provided at both ends, front and rear, of the bracket base 20 as harness protecting means.

Figure 7:
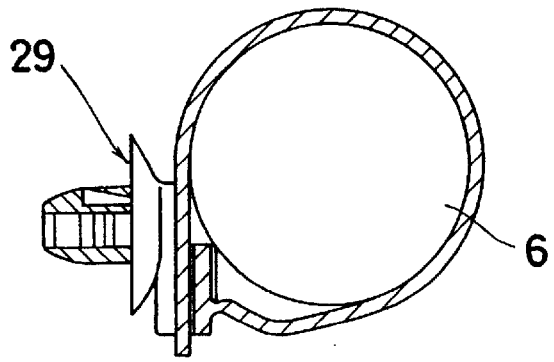
FIG. 7 is a sectional view of a clip for attaching an ABS harness to an ABS actuator bracket.
Figure 8:
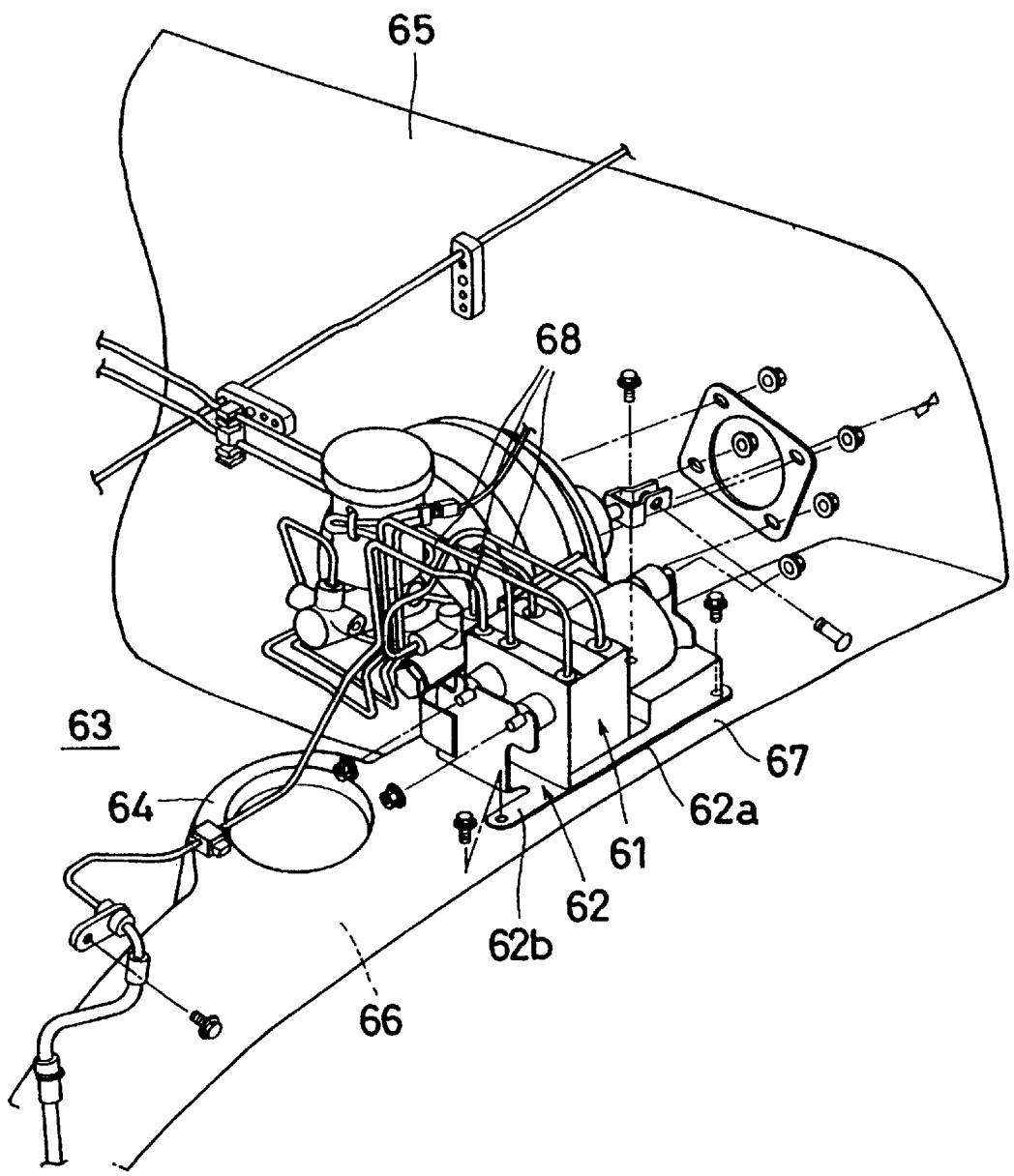
FIG. 8 is a perspective view showing a conventional arrangement construction of an ABS system.
Figure 9A:
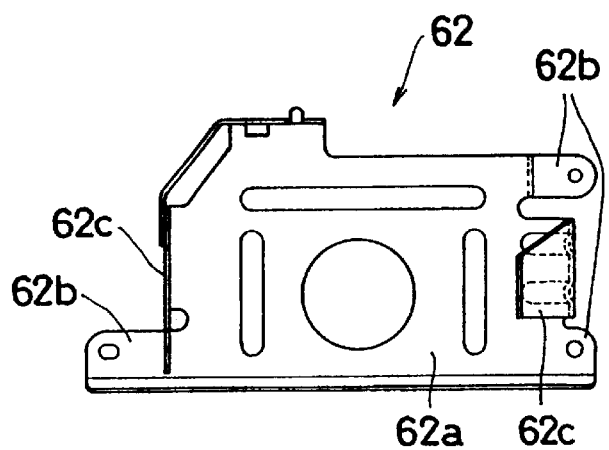
FIG. 9(a) is a plan view of an ABS actuator bracket used conventionally.
Figure 9B:
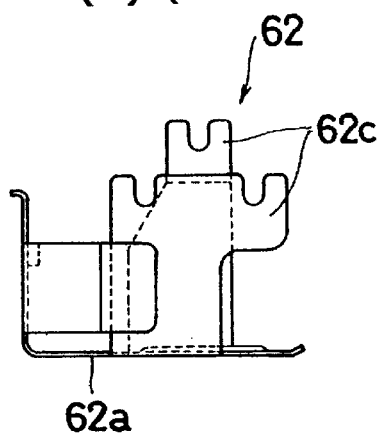
FIG. 9(b) is a front view thereof.
Figure 9C:
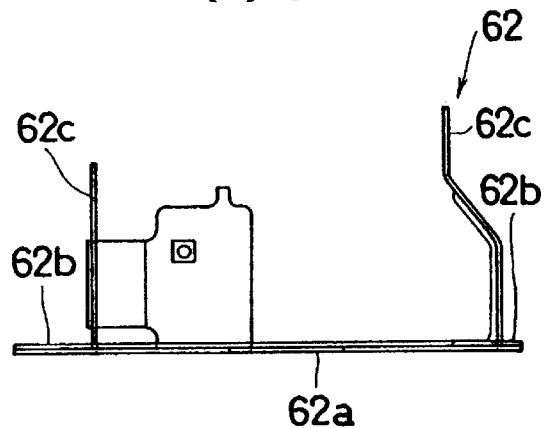
FIG. 9(c) is a side view thereof.

Further, the front end-side flange 23a is integrally formed with an ABS harness attachment element (vehicle part attachment element) 24. Specifically, the ABS harness attachment element 24 is provided in a location corresponding to a substantially central position in the transverse direction of the bracket base 20 in a state of being bent upward and erected substantially vertically with respect to the bracket base 20, so that the ABS harness attachment element 24 and the flange 23a are integrally connected to each other. Also, as clearly shown in FIG. 4, in an upper portion of the ABS harness attachment element 24, there is formed an elongated hole 25 extending slantwise, and in a side portion of the upper part of the ABS harness attachment element, there is formed a flange 26 consisting of a bent element for protecting ABS cables, which is bent so as to have a curved face and extends vertically. The elongated hole 25 is an elongated hole formed to lockingly fix an ABS harness positioning clip 29 as shown in FIG. 7 in a locked state.

Figure 5A:
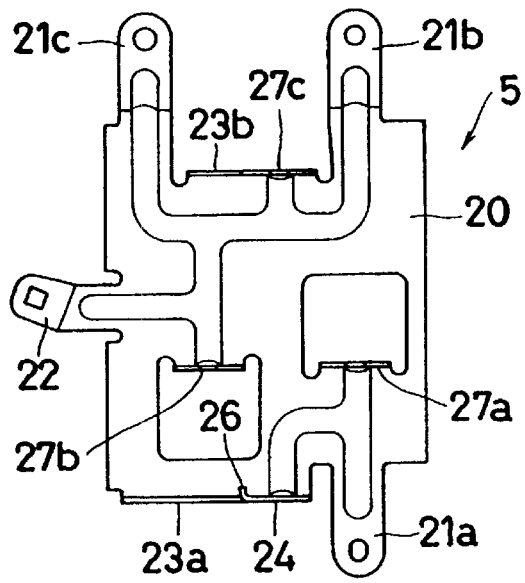
FIG. 5(a) is a plan view of an ABS actuator bracket.

Also, as clearly shown in FIGS. 4 and 5, the bracket base 20 has a flat plate-like portion as a base, and is provided with a pair of ABS actuator attachment portions 27a and 27b which are bent upward and erected in two predetermined locations on the front end side and one ABS actuator attachment portion 27c which is bent upward and erected at the rear end and formed integrally with the flange 23b. The paired ABS actuator attachment portions 27a and 27b are provided in line in the transverse direction of the bracket base 20, and the ABS actuator attachment portion 27c is provided in a location corresponding to an intermediate position between the ABS actuator attachment portions 27a and 27b at a predetermined distance (distance corresponding to the width of the ABS actuator 2) from the ABS actuator attachment portions 27a and 27b in a state of being opposed to the ABS actuator attachment portions 27a and 27b. In the top end portion of each of the ABS actuator attachment portions 27a to 27c, a U-shaped bolt insertion hole 28 is formed.

Figure 5B:
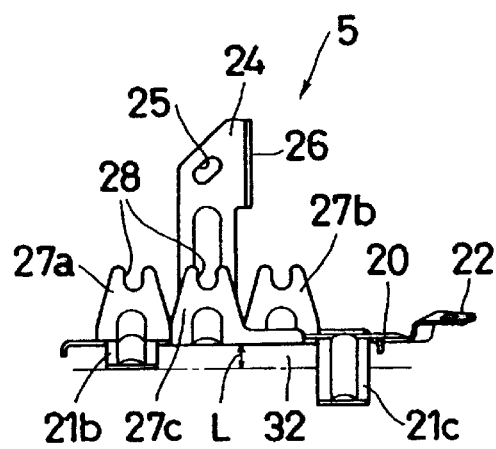
FIG. 5(b) is a back view thereof.
Figures 5C, 5D:
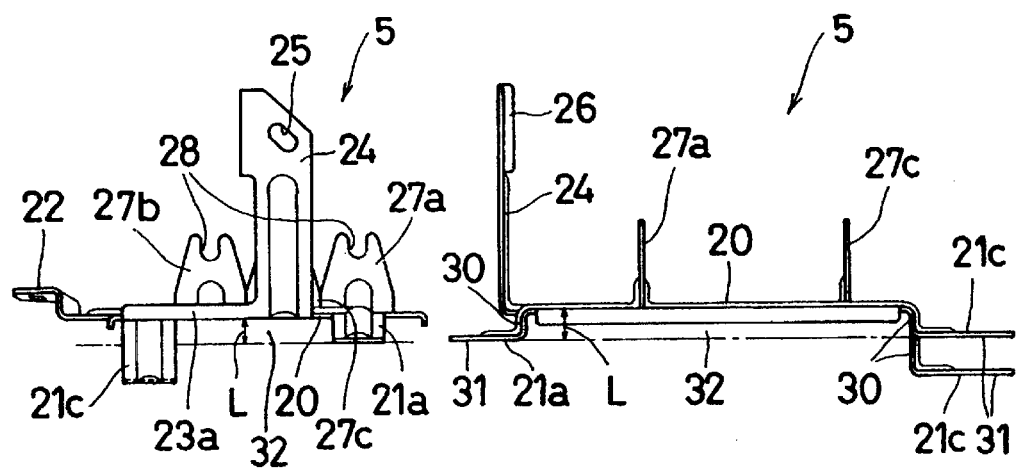
FIG. 5(c) is a front view thereof.
FIG. 5(d) is a side view thereof.

As clearly shown in FIGS. 4 and 5, the aforementioned vehicle body attachment elements 21a to 21c each have a leg portion (depending level difference portion) 30 which is bent downward substantially at right angles to the bracket base 20 and a horizontal vehicle body attachment portion 31 which is bent frontward or rearward substantially at right angles at the lower end of the leg portion 30. The height of the leg portion 30 of each of the vehicle body attachment elements 21a to 21c is set so as to be different according to the shape (height position) of a vehicle body panel portion to which each of the vehicle body attachment elements 21a to 21c is attached. Thereby, in the state in which the ABS actuator bracket 5 is attached to the vehicle body panel 4, a space portion 32 having a fixed distance L (see FIGS. 2 and 5(b) to 5(d)) between the bracket base 20 and the vehicle body panel 4 is formed by the presence of the leg portion 30 serving as the level difference portion. In this embodiment, as shown in FIGS. 1 and 4, the distance L of the space portion 32 is set so as to substantially correspond to the diameter of a main harness (power cable) 33 for supplying power from a battery (not shown) in the engine room 3 to various vehicle parts including the ABS actuator 2.

Also, as shown in FIG. 4, the vehicle body attachment portions 31 each are formed with a bolt insertion hole 34, and the auto cruise cable attachment element 22 is formed with a clip engagement hole 35 used for clamping an auto cruise cable 55. Further, the bracket base 20 is formed with openings 36 for decreasing the weight of the ABS actuator bracket 5, and also is formed with beads (portions whose cross section is bent into a curved shape) 37 extending along required paths to increase the strength of the ABS actuator bracket 5.

Figure 6A:
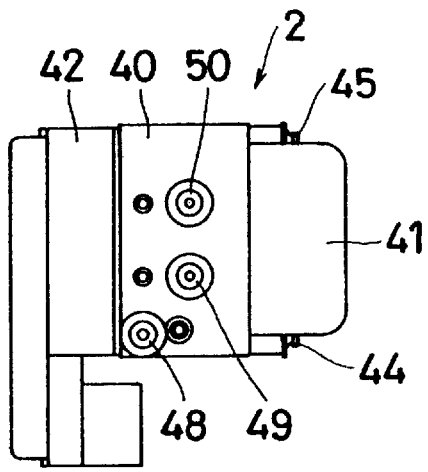
FIG. 6(a) is a plan view of an ABS actuator.
Figure 6B:
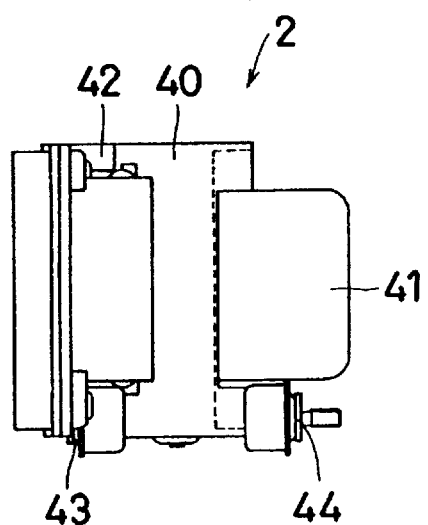
FIG. 6(b) is a side view thereof.
Figure 6C:
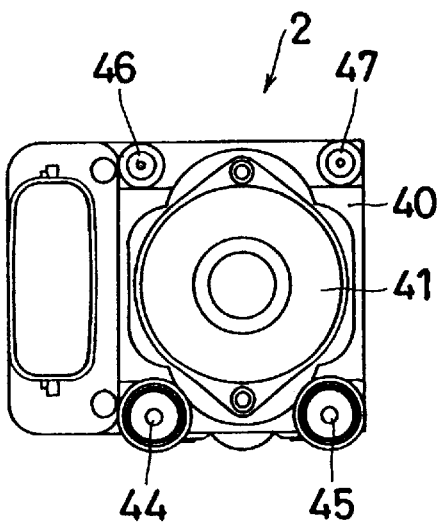
FIG. 6(c) is a front view thereof.

On the other hand, as shown in FIG. 6, the ABS actuator 2 used in this embodiment includes a hydraulic unit (HU) portion 40, a motor portion 41, and an electronic control unit (ECU) portion 42. At the lower part of the front part of the hydraulic unit portion 40, as shown in FIG. 6(b), one attachment bolt 43 is installed elastically in a state in which a screw portion thereof projects. At the lower part of the front part of the hydraulic unit portion 40, as shown in FIGS. 6(a) to 6(c), two attachment bolts 44 and 45 are installed elastically in a state in which a screw portion thereof projects. Also, at the front part of the hydraulic unit portion 40, as shown in FIG. 6(c), a primary input port 46 and a secondary input port 47 are provided. In the top portion of the hydraulic unit portion 40, as shown in FIG. 6(a), a right front output port 48, a left front output port 49, and a rear output port 50 are provided.

Next, the arrangement of the ABS system 1 in the engine room 3 will be described. First, the vehicle body attachment elements 21a to 21c of the ABS actuator bracket 5, having a level difference, are mounted on the vehicle body panel 4 and fastened thereto with bolts 51 (see FIG. 1), whereby the ABS actuator bracket 5 is attached to the vehicle body panel 4. In this state, the space portion 32 is formed between the bracket base 20 of the ABS actuator bracket 5 and the vehicle body panel 4, and the main harness 33 is installed in this space portion 32. Specifically, the main harness 33 run from the battery in the engine room 3 is run into the space portion 32 at a position near the vehicle body attachment element 21a at the front end of the ABS actuator bracket 5, passing through the space portion 32, and is run from the space portion 32 at a position between the vehicle body attachment elements 21b and 21c at the rear end of the ABS actuator bracket 5, whereby the main harness 33 is installed along the longitudinal direction of the vehicle body.

The ABS actuator 2 is attached to the ABS actuator bracket 5. Specifically, the screw portions of the attachment bolts 43 to 45 installed elastically in advance to the ABS actuator 2 are inserted in the bolt insertion holes 28 in erection elements 2c of the bracket base 20 and are mounted on the three erection elements 2c. In this state, a nut 52 is screwed on the screw portion of each of the attachment bolts 43 to 45, whereby the ABS actuator 2 is fastened to the ABS actuator bracket 5.

Figure 2:
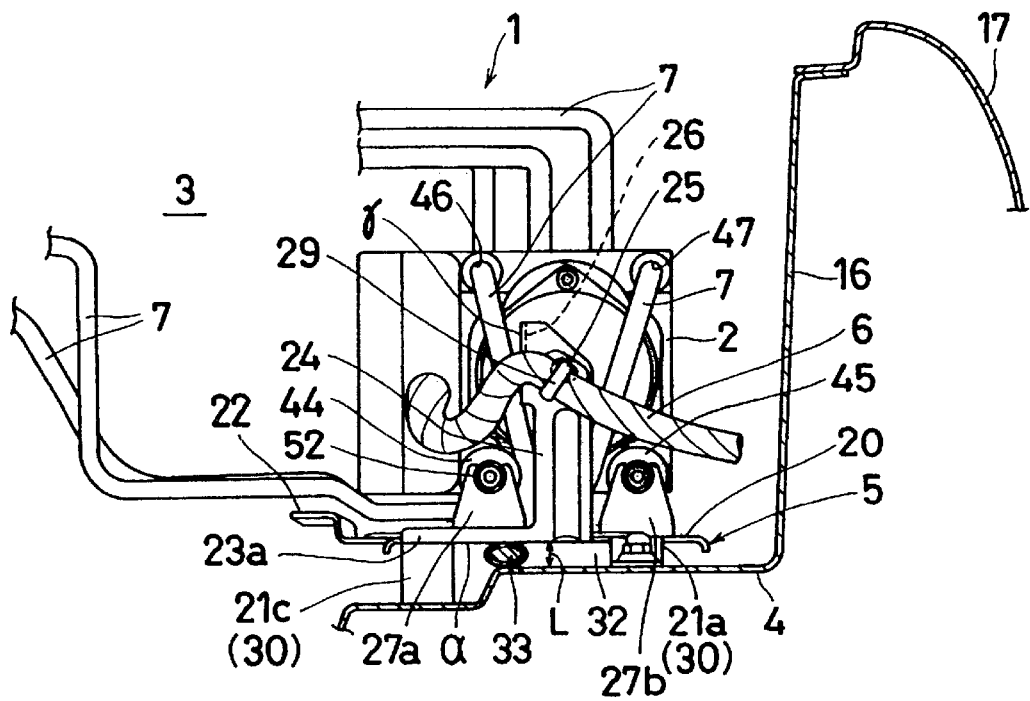
FIG. 2 is a front view of the arrangement construction of an ABS system shown in FIG. 1.
Figure 3:
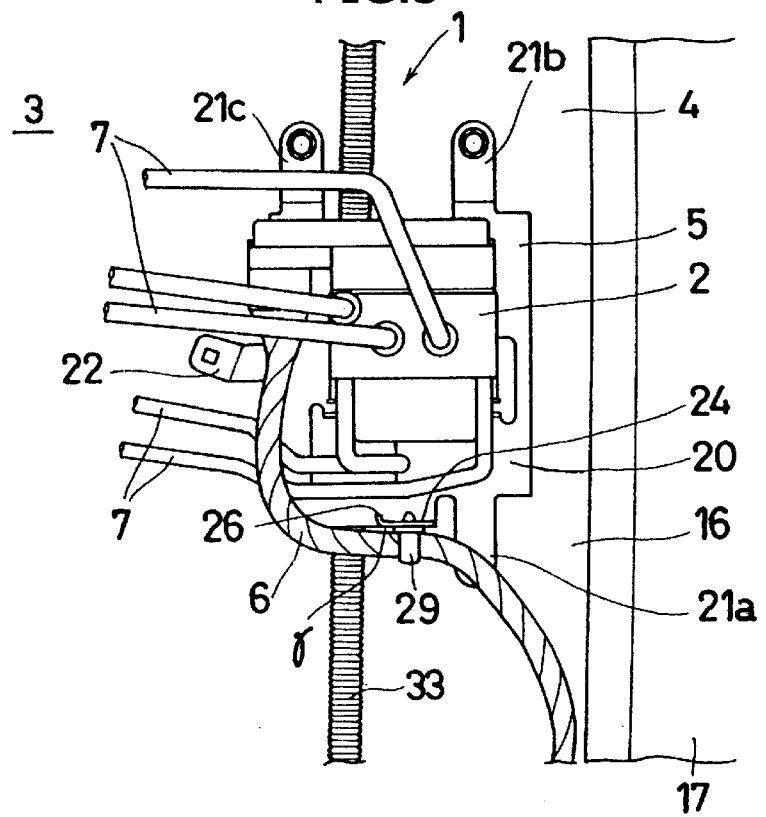
FIG. 3 is a plan view of the arrangement construction of an ABS system shown in FIG. 1.

In the ABS actuator 2 having been attached to the vehicle body panel 4 via the ABS actuator bracket 5, various brake pipes 7 one end of which is connected to the brake master cylinder are connected to the ports 46 to 50 in the ABS actuator 2. In this embodiment, as shown in FIGS. 1 and 2, two brake pipes 7 connected to the primary input port 46 and the secondary input port 47 are arranged at a position on the front side of the ABS actuator 2 and on the rear side of the ABS harness attachment element 24 of the ABS actuator bracket 5, that is, between the ABS actuator 2 and the ABS harness attachment element 24. Also, the two brake pipes 7 are arranged in a V shape in the front view as shown in FIG. 2 to facilitate the maintenance.

Also, to the ABS harness attachment element 24 of the ABS actuator bracket 5, the ABS harnesses (cables) 6 connected to various sensors are attached on the front side of the ABS harness attachment element 24, that is, in a location (vehicle body front location) on the opposite side to the two brake pipes 7 with respect to the ABS harness attachment element 24. Specifically, the ABS harnesses 6 are laid out so as to pass around the side of the ABS harness attachment element 24 and come into contact with a curved face γ of the root portion of the flange 26, and are clamped (positioned) by a clip 29 (see FIG. 7), which is lockingly fixed to the elongated hole 25 formed at the upper part of the ABS harness attachment element 24, in a locked state, so that the ABS harnesses 6 are laid out in the direction farther from the brake pipes 7. Thus, the ABS actuator attachment element 24 is disposed at a position that separates the brake pipes 7 from the ABS harnesses 6. Also, the ABS harnesses 6 are laid out via a location corresponding to the harness protective flange 26 provided at the upper part of the ABS harness attachment element 24.

On the other hand, the auto cruise cable 55 is attached to the attachment element 22, which is provided on the ABS actuator bracket 5, with a clip (not shown in FIG. 1).

According to the arrangement construction of the ABS system 1 configured as described above, the level difference portion (leg portion 30) is provided on the ABS actuator bracket 5 to form the space portion 32 between the bracket base 20 and the vehicle body panel 4 so that the main harness 33 can be run in the space portion 32 in the longitudinal direction of the vehicle body. Therefore, a trouble of dust and water being accumulated between the ABS actuator bracket 5 and the vehicle body panel 4 can be eliminated by the presence of the space portion 32. Also, since the space of the space portion 32 is set so as to substantially correspond to the diameter of the main harness 33, the main harness 33 can be laid out satisfactorily by utilizing a dead space (space portion 32) under the bracket base 20. Further, since the main harness 33 is run in the space portion 32, the main harness need not be laid out so as to go around the ABS actuator bracket 5, so that the main harness 33 can be shortened, and the layout path thereof can be simplified.

Moreover, the main harness 33 run in the space portion 32 is laid out so as to correspond to the curved faces α and β of the root portions of the flanges 23a and 23b at both ends in the longitudinal direction of the ABS actuator bracket 5. Therefore, a trouble of damage caused by the main harness 33 hitting the ABS actuator bracket 5 can be eliminated. Also, since the ABS harnesses 6 are laid out so as to pass around a position corresponding to the curved face γ of the root portion of the flange 26 of the ABS harness attachment element 24, damage to the ABS harnesses 6 can be prevented. Therefore, the ABS harnesses 6 can be laid out in the vicinity of the ABS actuator bracket 5.

Further, since the flanges 23a and 23b formed by upward bending are provided on the bracket base 20 of the ABS actuator bracket 5, the strength of the ABS actuator bracket 5 can be increased. Therefore, the plate thickness of the ABS actuator bracket 5 can be decreased as compared with the conventional case, so that reduced weight and lower cost can be achieved.

Also, the ABS harness attachment element 24 is provided at the front end of the ABS actuator bracket 5, and the ABS harnesses 6 are installed to the outside (vehicle body front side) of the bracket 5 with the clip 29, by which the ABS harnesses 6 and the brake pipes 7 are laid out with the ABS harness attachment element 24 held therebetween. Therefore, the ABS harnesses 6 and the brake pipes 7 are isolated from each other by the ABS harness attachment element 24, so that the ABS harnesses 6 can be prevented from vibrating and hitting the brake pipes 6. Moreover, the ABS harnesses 6 can be positioned by lockingly fixing the clip 29 to the elongated hole 25 in the ABS harness attachment element 24 in a locked state. This positioning of the ABS harnesses 6 can lay out the ABS harnesses 6 in the direction farther from the brake pipes 7, so that the interference of the ABS harnesses 6 with the brake pipes 7 can be prevented. Further, since the protective flange 26 is provided on the ABS harness attachment element 24 and the ABS harnesses 6 are arranged so as to correspond to the curved face γ of the protective flange 26, damage to the ABS harnesses 6 can be prevented.

The above is a description of one embodiment of the present invention, and the present invention is not limited to this embodiment. The present invention can be changed and modified variously based on the technical concept of the present invention. For example, although the flanges 23a and 23b are provided as means for protecting the main harness 33 in the above-described embodiment, a separate protective member may be disposed at the end of the bracket base 20 in place of the flanges 23a and 23b. Further, the configuration can be such that a vehicle part other than the main harness 33 (for example, ABS harnesses 6) is arranged in the space portion 32 to prevent the vehicle part from being damaged by using the protective means.

Also, although the ABS harness attachment element 24 provided on the ABS actuator bracket 5 is disposed at a position where the ABS harnesses 6 are isolated from the brake pipes 7, and the ABS harnesses 6 are fixed to the ABS harness attachment element 24 with the clip 29 in the above-described embodiment, both of the brake pipes 7 and the ABS harnesses 6 can be fixed to the attachment element 24 (in this case, the vehicle part attachment element 24).

Also, a vehicle part other than the ABS harnesses 6 may be attached to the vehicle part attachment element 24.

As described above, in the present invention, the ABS actuator bracket is formed by the bracket base on which the ABS actuator is mounted and the vehicle body attachment elements attached to the vehicle body panel, and the space portion having a space corresponding to the dimension of the vehicle part such as a harness is provided between the vehicle body panel and the bracket base of the ABS actuator bracket in a state in which the ABS actuator bracket is attached to the vehicle body panel, whereby the vehicle part is arranged so as to pass through the space portion. Therefore, the bracket base is not in contact with the vehicle body panel and is arranged so as to be separated from the vehicle body panel, so that dust and water entering therebetween can be removed easily without removing the ABS actuator bracket from the vehicle body panel. In addition, the vehicle part run in the space portion can be restrained in the space portion as necessary, and the vehicle part can be laid out satisfactorily by utilizing a dead space under the bracket base. In particular, in the case where a harness is run in the space portion, the harness need not be laid out so as to go around the ABS actuator bracket, so that the harness can be shortened, and the layout path thereof can be simplified.

Also, in the present invention, the protecting means for protecting the vehicle part is provided at the end of the bracket base of the ABS actuator bracket corresponding to the vehicle part. Therefore, a member such as a protective cover for preventing damage need not be provided on the side of the vehicle part, and the protective cover can be omitted.

Also, in the present invention, the flange, which is formed so as to erect by bending a part of the bracket base to the opposite side to the space portion, is provided as the protecting means. Therefore, the protecting means for the vehicle part can be provided on the ABS actuator bracket itself by appropriately setting the shape of the ABS actuator bracket, and a separate member used as the protecting means is not needed. Also, the simple configuration in which only the flange consisting of a bent element is provided increases the strength of the ABS actuator bracket, so that the thickness of the material of the ABS actuator bracket can be decreased as compared with the conventional case, by which reduced weight and lower cost can be achieved.

Also, in the present invention, the bent portion of the flange with respect to the end of the bracket base has a curved shape, and the curvedly-shaped portion (curved face) is arranged so as to correspond to the vehicle part. Therefore, even if the vehicle part such as a harness hits the curvedly-shaped portion of the root portion of the flange, the vehicle part is not damaged. For this reason, a special protector need not be installed on the harness.

Also, in the present invention, the ABS harness attachment element for fixing the ABS harnesses to the ABS actuator bracket is formed integrally with the flange. Therefore, since the ABS harness attachment element is reinforced by the flange provided so as to be connected to the ABS harness attachment element, the ABS harness attachment element can be constructed so as to be less liable to be bent with respect to the bracket base, so that the ABS harnesses can be supported with a sufficient support strength.

Also, in the present invention, the ABS harness attachment element is provided at the end of the bracket base of the ABS actuator bracket in a state of being bent upward with respect to the bracket base and being erected substantially vertically, so that the brake pipes are arranged between the ABS harness attachment element and the ABS actuator, and the ABS harnesses are attached to a location on the opposite side to the brake pipes with respect to the ABS harness attachment element. Therefore, when the ABS harnesses are laid out above the brake pipes, the ABS harnesses can be prevented from depending and hitting the brake pipes.

Also, in the present invention, the ABS harness attachment element is formed with the elongated hole for lockingly fixing the ABS harness positioning clip in a locked state, so that the clip is lockingly fixed to the elongated hole in a locked state to position the ABS harness with the clip, and the ABS harnesses are laid out in the direction farther from the brake pipes by the positioning of the ABS harnesses by using the clip. Therefore, the ABS harness portion clamped with the clip can be fixed in a positioned state (vibration-prevented state), and moreover the ABS harnesses can be laid out in the direction such as to be less liable to hit the brake pipes.

Also, in the present invention, the flange, which is bent so as to have a curved face and extends vertically, is provided in the side portion of the ABS harness attachment portion as ABS harness protecting means, and the ABS harnesses are laid out so as to be in contact with the curved face of the root portion of the flange. Therefore, the ABS harnesses can be laid out along a layout path such as to pass around the ABS harness attachment element.

Also, in the present invention, the vehicle part attachment element is provided on the ABS actuator bracket for attaching the ABS actuator to the vehicle body panel, the vehicle part attachment element is arranged at a position at which brake pipes of the ABS actuator are separated from a vehicle part, and at least one of the brake pipe and the vehicle part is fixed to the vehicle part attachment element. Therefore, the operation and effects as described below can be achieved. According to the present invention, since the ABS harness attachment element is disposed between the brake pipes and the ABS harnesses as if it is a partitioning plate (block element), even if the ABS harnesses are laid out near the brake pipes, which are important parts of the vehicle, there is no fear that the ABS harnesses hit the brake pipes. Generally, when the brake pipes and the ABS harnesses are laid out, in many cases, they must be arranged close to each other in a state in which they intersect each other around the ABS actuator. If the present invention is applied, in such a case, the interference between the brake pipes and the ABS harnesses can be prevented surely.

Also, in the present invention, the vehicle part is ABS harnesses for connecting various sensors such as a wheel speed sensor and a vehicle body acceleration sensor to the ABS actuator. Therefore, the ABS harnesses can surely be prevented from vibrating and hitting the brake pipes.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purpose of limitation.

What is claimed is:

1. An arrangement construction of an ABS system, comprising:
    an ABS actuator for preventing a wheel from locking at the time of braking, said ABS actuator constituting said ABS system;
    an ABS actuator bracket for attaching said ABS actuator to a vehicle body panel;
    ABS harnesses for connecting sensors to said ABS actuator; and
    brake pipes for supplying and discharging brake oil to and from said ABS actuator,
    wherein said ABS actuator bracket comprises a bracket base on which said ABS actuator is mounted and vehicle body attachment elements attaching said bracket base to said vehicle body panel, wherein said ABS actuator bracket is configured to form a space between said vehicle body panel and the bracket base of said ABS actuator bracket which space is dimensioned to allow a vehicle part to pass therethrough.

2. The arrangement construction of an ABS system according to claim 1, further comprising protecting means for protecting a vehicle part at at least one end portion of the bracket base of said ABS actuator bracket.

3. The arrangement construction of an ABS system according to claim 2, wherein said protecting means comprises a flange formed by bending a part of said bracket base away from said space.

4. The arrangement construction of an ABS system according to claim 3, wherein a bent portion of said flange with respect to the end of said bracket base has a curved shape, and the curvedly-shaped portion is arranged so as to correspond to said vehicle part.

5. The arrangement construction of an ABS system according to claim 3, further comprising an ABS harness attachment element for fixing said ABS harnesses to said ABS actuator bracket formed integrally with said flange.

6. The arrangement construction of an ABS system according to claim 5, wherein said ABS harness attachment element comprises an upwardly bent end portion of the bracket base of said ABS actuator bracket to form a substantially vertical element, wherein said brake pipes are arranged between said ABS harness attachment element and said ABS actuator, and said ABS harnesses are attached to a location on the opposite side to said brake pipes with respect to said ABS harness attachment element.

7. The arrangement construction of an ABS system according to claim 5, wherein said ABS harness attachment element defines an elongated hole therein and includes a chip lockingly fixed to said elongated hole to position said ABS harness, and wherein said ABS harnesses are arranged in a direction away from said brake pipes by using said clip.

8. The arrangement construction of an ABS system according to claim 6, further comprising a flange formed by bending a side portion of said ABS harness attachment portion to provide a vertically extending ABS harness protecting means having a curved face, wherein said ABS harnesses are positioned to contact the curved face of a root portion of said flange.

9. An arrangement construction of an ABS system, comprising a vehicle part attachment element provided on an ABS bracket for attaching an ABS to a vehicle body panel; brake pipes for supplying and discharging brake oil to and from an ABS actuator; and a vehicle part, wherein said vehicle part attachment element is arranged on said ABS actuator bracket at a position at which brake pipes of an ABS actuator are separated from a vehicle part, and at least one of said brake pipes and said vehicle part is fixed to said vehicle part attachment element.

10. The arrangement construction of an ABS system according to claim 9, wherein said vehicle part is ABS harnesses for connecting sensors to said ABS actuator.

* * * * *

UNITED STATES PATENT AND TRADEMARK OFFICE
CERTIFICATE OF CORRECTION

PATENT NO.    : 6,386,650 B2
DATED         : May 14, 2002
INVENTOR(S)   : Kouzuki It is certified that error appears in the above-identified patent and that said Letters Patent is hereby corrected as shown below:

Title page,
Item [73], Assignee: in the address, "Shizuoka-ken" should read --    --.

Column 10,
Line 54, after "ABS" insert -- actuator --.

Signed and Sealed this

Twenty-second Day of October, 2002

Attest:

JAMES E. ROGAN
Attesting Officer          Director of the United States Patent and Trademark Office

UNITED STATES PATENT AND TRADEMARK OFFICE
CERTIFICATE OF CORRECTION

PATENT NO. : 6,386,650 B2
DATED : May 14, 2002
INVENTOR(S) : Kouzuki

It is certified that error appears in the above-identified patent and that said Letters Patent is hereby corrected as shown below:

Title page,
Item [73], Assignee, "Shizuoka-ken" should read -- Hamamatsu --.

Coumn 10,
Line 54, after "ABS" insert -- actuator --.

This certificate supersedes Certificate of Correction issued October 22, 2002.

Signed and Sealed this

Ninth Day of November, 2004

JON W. DUDAS
*Director of the United States Patent and Trademark Office*